(12) United States Patent
Yalamanchi et al.

(10) Patent No.: US 8,250,048 B2
(45) Date of Patent: Aug. 21, 2012

(54) ACCESS CONTROL FOR GRAPH DATA

(75) Inventors: Aravind Yalamanchi, Nashua, NH (US); Jayanta Banerjee, Nashua, NH (US); Souripriya Das, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 333 days.

(21) Appl. No.: 12/386,560

(22) Filed: Apr. 20, 2009

(65) Prior Publication Data

US 2010/0268722 A1    Oct. 21, 2010

(51) Int. Cl.
*G06F 7/00* (2006.01)
(52) U.S. Cl. ...................................................... 707/705
(58) Field of Classification Search ................. 707/772, 707/705

See application file for complete search history.

(56) References Cited

U.S. PATENT DOCUMENTS

| | | | |
|---|---|---|---|
| 4,933,848 A | 6/1990 | Haderle et al. | |
| 5,386,557 A | 1/1995 | Boykin et al. | |
| 5,408,657 A | 4/1995 | Bigelow et al. | |
| 5,706,494 A | 1/1998 | Cochrane et al. | |
| 5,899,993 A | 5/1999 | Jenkins, Jr. | |
| 6,047,285 A | 4/2000 | Jacobs et al. | |
| 6,453,314 B1 | 9/2002 | Chan et al. | |
| 7,272,589 B1 | 9/2007 | Guay et al. | |
| 2004/0107200 A1 | 6/2004 | Sjogren et al. | |
| 2007/0234288 A1* | 10/2007 | Lindsey et al. | 717/117 |
| 2009/0300002 A1* | 12/2009 | Thomas et al. | 707/5 |
| 2010/0153149 A1 | 6/2010 | Prigge et al. | |

OTHER PUBLICATIONS

US Patent and Trademark Non-Final Office Action in co-pending U.S. Appl. No. 12/507,244, filed Jul. 22, 2009; notification date Dec. 14, 2011.

Murray et al., Oracle Spatial Resource Description Framework (RDF) log Release 2 (10.2), Oct. 2005.

* cited by examiner

*Primary Examiner* — Truong Vo

(74) *Attorney, Agent, or Firm* — Kraguljac Law Group, LLC

(57) ABSTRACT

Systems, methods, and other embodiments associated with access control for graph data at the instance-level are described. One example method includes accepting data access constraints that are expressed as match and apply pattern pairs to enforce security policies. A user query on graph data with a security policy restricts the returned data to data that the user is authorized to access. For this purpose, a user query that includes query selection criteria corresponding to one or more match pattern criteria based on the resource referenced in the query is rewritten to include security conditions specified in the associated apply pattern to restrict access to the graph data.

21 Claims, 7 Drawing Sheets

ACCESS CONTROL FOR GRAPH DATA

BACKGROUND

Data access control mechanisms are used to restrict access to data within a data repository to authorized users. One common access control system is a Virtual Private Database (VPD). The VPD is a fine-grained access control mechanism, that restricts users' access to specific instances of data stored in a common repository using application contextual information about the user and/or the session during which access is requested. When the data is stored in relational tables, access to specific rows in the table is controlled using a technique called query rewrite. This technique intercepts each user query and appends specific security conditions that filter out sensitive data that would otherwise be included in the result set of the query. The security conditions are dynamically generated based on the application context. The logic that generates appropriate security conditions for a given query is typically hand-coded by a security administrator.

VPD techniques, when applied to relational tables, restrict access to specific rows in the table by evaluating the security conditions on the corresponding rows. Often the security conditions are expressed using the columns defined in the table so that these conditions are evaluated in addition to any predicates in the WHERE clause of a user query. The security conditions may also make use of the application context to derive, for example, the employee's department number at the time of query execution, so that records relevant to the employee's department may be returned for the query. Often enforcement of the security conditions leverages from the metadata of the data instances it secures to define a handful of security conditions that can impose access restrictions on large volumes of data.

The relational data model is well suited for highly structured data with well-defined semantics, which are captured in the columns defined in the relational table. In contrast, graph data models, such as, for example, RDF data models are increasingly being used to store and manage graph data which is often less structured and less predictable than their relational counterparts. In addition, new data can be inferred from RDF data using inference engines and inference rules. In an RDF data model, the data is modeled as directed graphs and they are represented as a set of triples or statements. The nodes in the graph are used to represent two parts of a given triple, and the third part is represented by a directed link that describes the relationship between the nodes. In the context of an RDF statement, the two nodes are referred to as Subject and Object and the link describing the relationship is referred to as the predicate or Property.

RDF data models implicitly support access control at the graph level, which mimic table-level access control mechanisms in relational data model. However, techniques to restrict access to specific parts of the RDF graphs are rarely explored. One mechanism for restricting access to RDF data includes allowing individual triples to be stamped with sensitivity labels so that the triples returned for any given query are limited to triples with labels that are compatible with a user's access labels. However, the cost of assigning and maintaining labels for each data instance may prove prohibitive for handling real-world security requirements that are often based on the characteristics of the data being accessed. For example, policies that limit access to information about a business contract to users working on the contract may result in creating unique labels for each contract and granting corresponding access labels to specific users.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
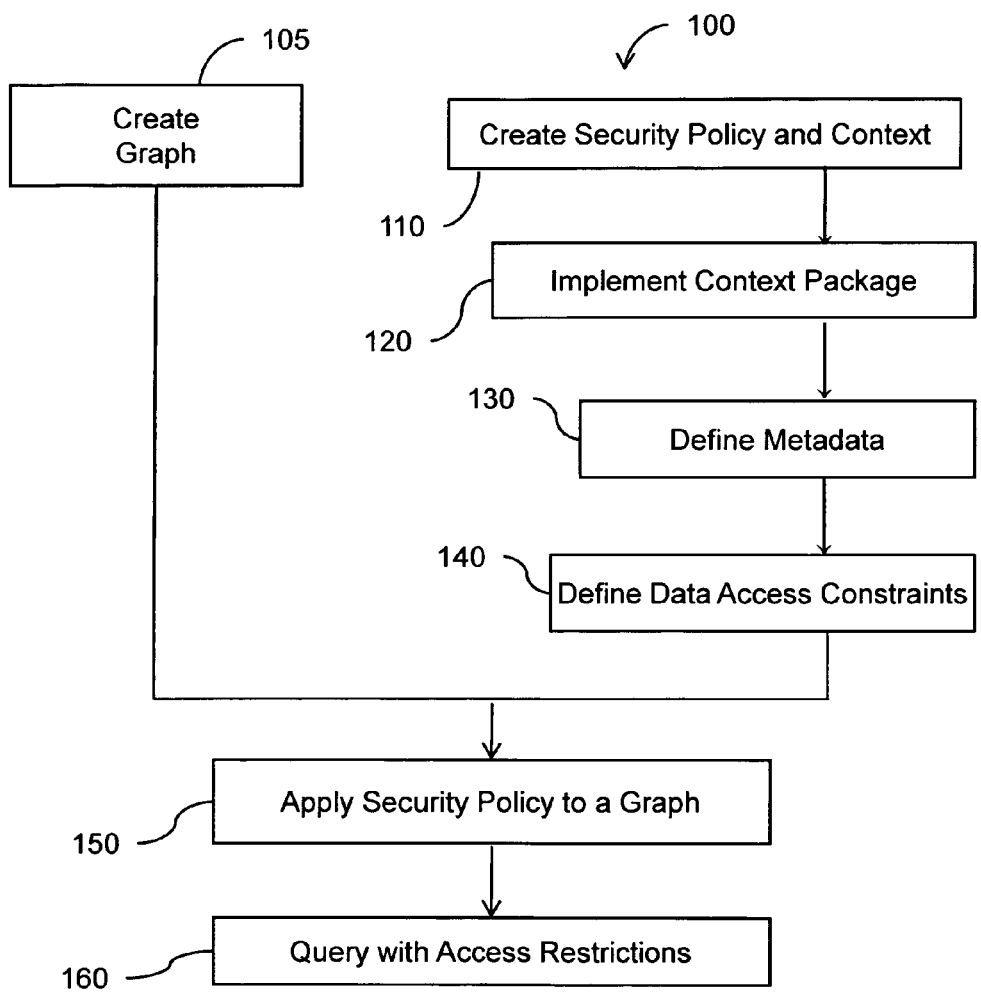
FIG. 1 illustrates an example embodiment of a method associated with access control for RDF data.

The graph data access control techniques described herein allow for implementation of intuitive constraints that reuse the instance data to restrict access to specific data instances to specific users. Hence a handful of strategic data access constraints may be used to restrict access to large volumes of data. Furthermore, use of session context in the data access constraints allows enforcement of context-dependent access restrictions. In many of the described embodiments RDF graph data is discussed, however it will be apparent to one of skill in the art that the data access control techniques described herein may be practiced with any type of graph data.

In one embodiment, access control for RDF data restricts users' access to instances of a specific RDF class or property by applying security conditions, in the form of graph patterns and filter conditions (standard SPARQL query language terminology), on the instance data. For example, a security policy may be defined to restrict access to instances of a "Contract" RDF class to users belonging to a specific department. Furthermore, access to the "hasContractValue" property for a resource identified as an instance of the Contract RDF class may be restricted to the manager of the contract. Instance-level access control for RDF data allows security conditions or data access constraints to be associated with RDF classes and properties so that access to corresponding instance data is restricted.

In one embodiment, a data access constraint associated with an RDF class or property specifies a graph query pattern that is to be enforced for corresponding data instances that are returned as a result of a query. For example, a SPARQL query pattern to find the due dates for instances of Contract class, {?contract :hasDueDate ?due}, may activate a data access constraint that ensures that the information returned pertains to contracts belonging to a specific department, when queried by an employee from that department. This is achieved by logically rewriting the user's graph query pattern to include additional graph patterns as shown below.

```
{ ?contract :hasDueDate ?due .
  ?contract :drivenBy dept:Dept1 }
```

Furthermore the values bound into the rewritten graph query pattern may make use of session context to enforce dynamic access restrictions. In the following example, the sys_context function in the object position of the triple pattern binds the appropriate department value based on the session context.

```
{ ?contract :hasDueDate    ?due .
  ?contract :drivenBy
      "sys_context('sa$appctx','user_dept')"^^orardf:instruction }
```

In this manner, queries may be rewritten based on access constraints associated with RDF data classes and properties that can be identified from queries on the data to efficiently enforce the access restrictions on a wide range of RDF instance data.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes but is not limited to hardware, firmware, software stored on a computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL), an OQL, a natural language, and so on.

"Software", as used herein, includes but is not limited to, one or more executable instruction stored on an computer-readable medium that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 is an overview flow diagram of an embodiment of a method 100 for providing access control for RDF data. At 105 an RDF graph is created. Unlike a relational data model, the RDF data model allows data with no accompanying metadata. Hence, the class information for instance data may not always be available for a given RDF graph. For example in an RDF graph, a resource known to be a contract may not accompany a triple that asserts that the resource is an instance of Contract class. Most often such triples can be inferred using available domain and range specifications for the properties describing the resource. Similarly a security policy that enforces access restrictions relies on the properties' domain and range specifications for deriving the class information for the instance data and for enforcing appropriate data access constraints. However, to avoid runtime dependencies on the user data, a security policy may maintain minimal metadata that can be used to derive the class information in its dictionary, separate from the asserted and inferred triples. This would also ensure that the metadata maintained by a security policy is complete even when some necessary information is missing from the asserted triples and that a security policy, with its data access constraints and the metadata, is self-contained, secure, and portable with no external dependencies.

At 110, a security policy and a context are created. A security policy with specific data access constraints and RDF metadata specifications can be used to enforce access restrictions for the data stored in an RDF graph. Each SPARQL query issued on the graph is analyzed to deduce the class information for the resources accessed in the query and appropriate data access constraints are applied. The query selection criteria within a SPARQL query, expressed as graph patterns involving one or more predicates, are used to identify the class information for the resources accessed by the query. To facilitate the compile time analysis and derivation of class information for instance data, a query graph pattern with an unbound predicate may be restricted when a security policy is in effect. For example, a graph pattern of the following form, anywhere in a SPARQL query pattern, may raise an exception when the underlying graph(s) has a security policy.

{<contract:projectHLS> ?pred ?obj}

A security policy for RDF data is a named dictionary entity, which can be used to enforce access restrictions for the data stored in one or more RDF graphs. An RDF security policy defined in the database includes: 1) the RDF schema statements or metadata necessary for deriving class information for the data referenced in a SPARQL user query; 2) the data access constraints that enforce access restrictions for the instance data; and 3) application context that allows conditional inclusions of groups of data access constraints based on the runtime environment.

An RDF security policy is defined, owned, and maintained by a user with a security administrator role in an organization. The owner of an RDF security policy can maintain the metadata associated with the policy, define new data access constraints, and apply the policy to one or more RDF graphs.

A SPARQL query issued on an RDF graph with a security policy is analyzed and zero or more data access constraints defined in the policy are enforced such that the data instances that are returned as the query result also satisfy these constraints. The exact data access constraints enforced for a user query vary broadly based on the resources referenced in the query and the application context. For example, a policy that restricts a Manager's access to the hasContractValue property may be relaxed for a user with a Vice President role. Based on the role of user, as captured in the application context, the specific constraints to be applied are determined at runtime. To facilitate this dynamic inclusion of subsets of constraints defined in a security policy, in some embodiments, the data constraints are arranged into named groups that can be activated and deactivated based on the application context. During query analysis, the constraints defined in the active groups are considered for enforcement.

At 120, an application context package is implemented so that the constraint groups defined in a security policy are activated or deactivated for each user session based on the user's participation in a group. For example a set of constraints that enforce access restrictions for Managers in an organization may be defined in one group and the constraints that enforce access restrictions for Vice Presidents may be defined in another group. Appropriate constraint group may be activated for each user session based on the user's role in the organization. The logic that initializes specific constraint groups based on the user context is implemented by the security administrator that defines the security policy. Once a constraint group is activated for a user session, subsequent SPARQL queries in the session consult the constraints defined in the group to enforce appropriate access restrictions.

A security policy enforcing access restrictions for data stored in a specific RDF graph is automatically extended to any data inferred from the graph. In other words, a SPARQL query spanning asserted triples stored in an RDF graph and inferred triples stored in an internal repository consult the data access constraints defined in active constraint groups and apply them accordingly. For example, a constraint that restricts access to instances of Contract class automatically applies to asserted triples and inferred triple describing a Contract instance.

Figure 2:
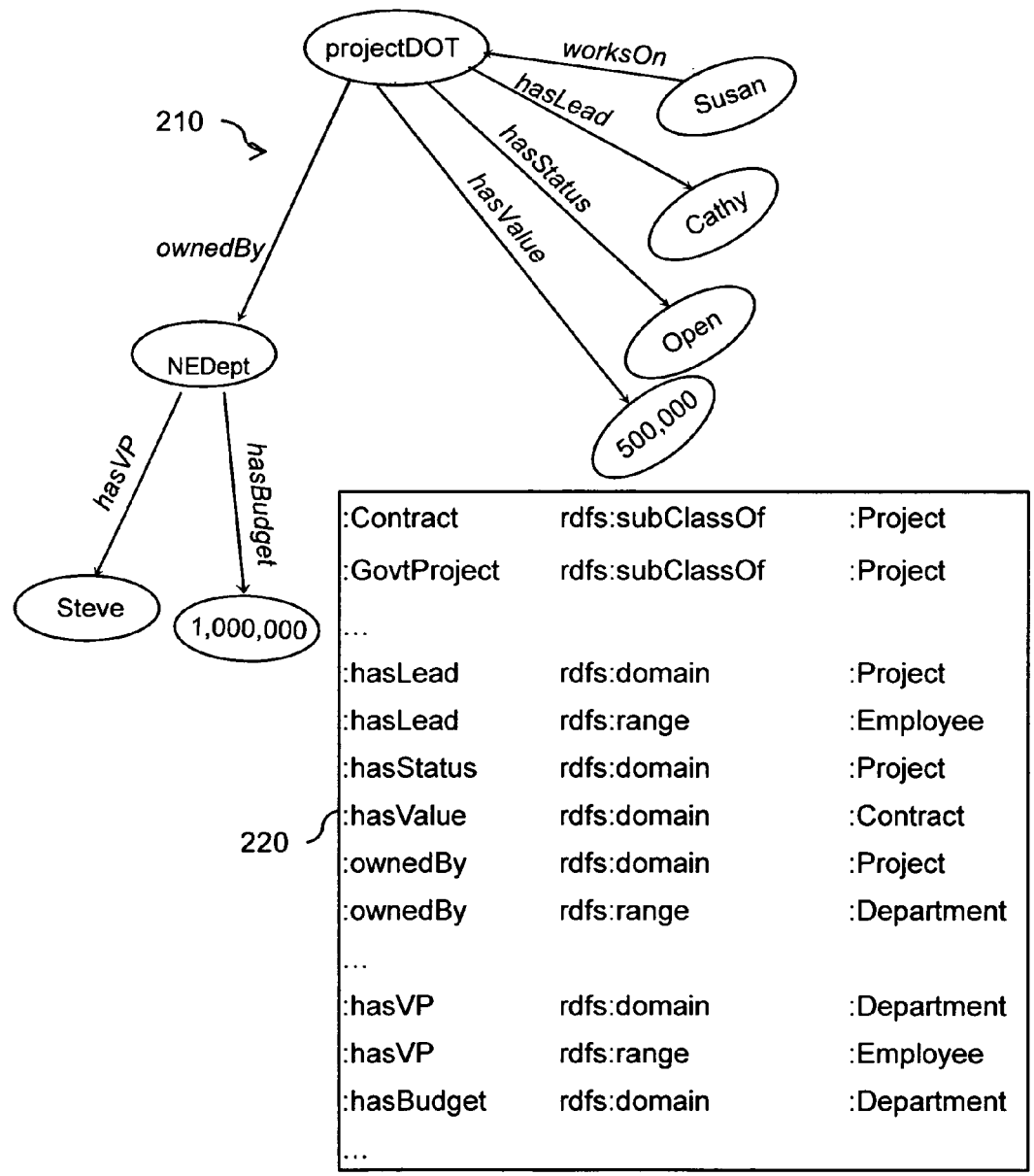
FIG. 2 illustrates an example RDF graph and metadata associated with a described embodiment of access control for RDF data.

At 130, RDF metadata is defined for use in maintaining and enforcing the security policy. Unlike a relational data model, an RDF data model may not always associate metadata or schema information for data stored in a graph. However, the security based access control mechanism relies on the metadata for the data being accessed and this is achieved by associating the metadata directly with the policy. For example, in order to apply a constraint for instances of Contract RDF class, the query analyzer should be able to recognize when an instance of this class is being accessed with a SPARQL query. The types of RDF metadata collected by a security policy to facilitate this analysis include: domain and range information for the properties used in the graph; subclass relationships in the graph; sub-property relationships in the graph; and equivalent properties in the graph. FIG. 2 illustrates an example RDF security policy metadata 220 for RDF data in a graph 210.

Using this RDF metadata, the class information for the data accessed in a SPARQL query may be derived. For example, if the domain for hasContractValue property is asserted to be a Contract class (using the following RDF schema statement), the query analyzer concludes that the variable ?c in the graph pattern {?c pred:hasContractValue ?v}, is an instance of Contract class and thus applies corresponding access constraints. RDF Schema Statement: pred:hasContractValue rdfs:domain class:Contract An RDF security policy maintains its metadata separate from the asserted and inferred triples and this metadata may be programmatically derived from the RDF graph and the inferred data, when possible. For example, if the domain and range information for the properties and subclass and sub-property relationships are already established in the asserted and/or inferred triples, a SQL query on the underlying graphs may be used to populate the metadata for an RDF security policy.

The domain and range information for the properties aid the query analysis in determining the RDF Class type for the terms and unbound variables referenced in the query. This information is further used to enforce appropriate data access constraints on the data. The metadata relating to the subclass property is used to ensure that a data access constraint defined for a specific class in a class hierarchy is automatically enforced for its subclasses. Similarly, the sub-property specification in a security policy is used to enforce any constraints associated with a property to its sub-properties.

Returning to FIG. 1, at 140, data access constraints are defined. The data access constraints fall into two categories based on the types of access restrictions they enforce. A first category of data access constraints restrict access to instances of specific RDF classes. A second category of data access constraints restrict access to instances of specific RDF properties. The access constraints are enforced conditionally based on the application context and/or the characteristics of the resources being accessed in a SPARQL query.

Data access constraints restrict access to instance of an RDF class or property using other properties associated with the resource being accessed. For example, access to a resource that is a member of Contract class may be restricted to the users who work on the contract, identified using hasMember property associated with the resources. Similarly, access to the hasContractValue property for a resource may be restricted to a user identified as the manager of the contract using hasManager property associated with the same resource.

Each data access constraint in the security policy is expressed using two graph patterns identified as a match pattern and an apply pattern. The match pattern of a constraint determines the type of access restriction it enforces and binds one or more variables to the corresponding data instances accessed in the user query. For example, the following match pattern is defined for instances of Contract class and it binds a variable to all such instances accessed through a SPARQL query:

{?contract rdf:type <http://www.myorg.com/classes/Contract>}

Similarly, a match pattern for a constraint involving an RDF property matches the instances of the property accessed in a SPARQL query and binds two variables to the resources in the subject and the object position of such instances. For example the match pattern for a constraint on hasContractValue property is defined as follows:

{?contract <http://www.myorg.com/pred/hasContractValue>?cvalue}

The apply pattern of a data access constraint defines additional graph patterns to be applied on the resources identified by the match pattern before they can be used to construct the query results. One or more variables defined in the match pattern of a data access constraint are used in the corresponding apply pattern to enforce the access restrictions on the identified resources. Effectively, the graph patterns defined in an apply pattern form a security condition that restricts access to sensitive instance data. For example, the following match pattern and apply pattern combination ensures that hasContractValue of a contract can be accessed if Andy is the manager of the contract being accessed.

```
Match:  { ?contract   pred:hasContractValue   ?cvalue }
Apply:  { ?contract   pred:hasManager         emp:Andy }
```

A data access constraint with its match and apply patterns expressed in standard SPARQL syntax may be added to a security policy to enforce access restrictions on the data stored in RDF graphs associated with the security policy. The following command that adds a constraint to the security policy assumes that the security policy is defined with appropriate namespace map for pred and emp namespace prefixes.

```
begin
  sem_rdfsa.add_vpd_constraint(
    policy_name => 'contracts_policy',
    constraint_name => 'andy_constraint_1',
    match_pattern => '{?contract pred:hasContractValue ?cvalue }',
    apply_pattern => '{?contract pred:hasManager    emp:Andy }',
    constraint_group => 'andy');
end;
```

The ability to arrange data access constraints into groups could ensure that the previous constraint is applied for the sessions associated with Andy. However, to avoid duplication of structurally similar constraints for each user, a common constraint may be defined to make use of application context in the object position of the apply graph patterns as shown below.

```
Constraint Group: manager
Match:  { ?contract   pred:hasContractValue   ?cvalue }
Apply:  { ?contract   pred:hasManager
          "sys_context('sa$appctx','app_user_uri'}"^^ora:function }
```

The above data access constraint defined within a manager constraint group may be activated for sessions involving users with a manager role. In this case, the secure application context may be programmed to initialize the attribute app_user_uri of the sa$appctx namespace with the URI for the user logged in. For instance, when a user Andy logs into the application, this attribute may be initialized to <http://www.myorg.com/employee/Andy>, in which case the above constraint will ensure that Andy can view the value for a contract if he manages the contract. Generally, the sys_context function may be used in the object position of any graph pattern to allow dynamic URIs or literal values to be bound at the time of query execution. Note that if the context is not initialized properly, the above constraint will fail for all data instances and effectively restrict the user from accessing any data.

At 150, the security policy is applied to the RDF graph. Subsequent queries on the RDF graph will be subject to the security policy. At 160, queries are processed with enforcement of access restrictions. A SPARQL query issued on an RDF graph with a security policy is analyzed using the match patterns of the active data access constraints defined in the policy. For example, the following user query refers to the hasContractValue property, thereby enforcing the above constraint (assuming the group is active). Logically, the enforcement of a constraint is equivalent to rewriting the original SPARQL graph pattern to include the apply patterns from the relevant constraints using appropriate variables and terms from the user query. For example, with previous access restriction on the hasContractValue property, the following SPARQL graph pattern issued on the underlying RDF graph is logically rewritten as shown below.

```
Query:
  { ?contr pred:drivenBy       ?dept .
    ?contr pred:hasContractValue ?val }
Rewritten query:
  { ?contr pred:drivenBy       ?dept .
    ?contr pred:hasContractValue ?val .
    ?contr pred:hasManager
        "sys_context('sa$appctx','app_user_uri'}"^^orardf:instruction }
```

When the match pattern of a data access constraint on an RDF property matches the pattern being accessed in a user query, the equivalent data access constraint-enforced query appends the corresponding apply patterns to the SPARQL query using the variables and terms appearing in the matched pattern. When a SPARQL query has nested graph patterns, the data access constraints are applied to appropriate basic graph pattern query block. In the following example, the hasContractValue property is referenced in the OPTIONAL graph pattern and hence the corresponding apply pattern is enforced just for this block of the graph pattern.

```
Query:
    { ?contr pred:drivenBy    ?dept .
      OPTIONAL { ?contr pred:hasContractValue ?val } }
Rewritten query:
    { ?contr pred:drivenBy    ?dept .
      OPTIONAL { ?contr pred:hasContractValue ?val .
           ?contr pred:hasManager
      "sys_context('sa$appctx','app_user_uri'}"^^orardf:instruction }
```

The apply pattern for a data access constraint may specify any valid basic graph pattern with multiple triple patterns and a FILTER clause. For example, the access constraint on the hasContractValue property for a user with VP role may stipulate that the user can access the property if he is the VP of the department driving the contract. The match and apply patterns for such constraint may be defined as follows:

```
Constraint Group: VP
Match:  { ?contract    pred:hasContractValue    ?cvalue }
Apply:  { ?contract    pred:drivenBy    ?dept .
          ?dept    pred:hasVP
      "sys_context('sa$appctx',
      'app_user_uri'}"^^orardf:instruction }
```

The match patterns defined in the constraints discussed above restrict access to instances of specific property, pred:hasContractValue, by rewriting the user query to include appropriate apply patterns. The apply patterns act as security conditions on the data instances being accessed through the secure property and they filter out any information that does not satisfy the criteria. For each incoming SPARQL query, the graph patterns are analyzed for any references to the properties with access constraints or any of their sub-properties for the exact list of constraints to be applied.

A match pattern that is defined for a data access constraint associated with an RDF Class identifies variables and terms that are known to be instances of the class. The RDF metadata defined in the security policy is used to determine the type for each variable and the term in a SPARQL query and the appropriate access constraints are applied on these variables and terms. For example, the following constraint ensures that access to a resource that is an instance of Contract class may be restricted to users who hold a hasMember relationship with the resource.

```
Match:  { ?contract    rdf:type <http://www.myorg.com/classes/Contract> }
Apply:  { ?contract    pred:hasMember
      "sys_context('sa$appctx',
      'app_user_uri'}"^^orardf:instruction }
```

The class information for a variable or term appearing in a SPARQL query is derived using the domain and range information for the properties appearing in the query. For the sample SPARQL query shown below, if the security policy has an RDF Schema statement that asserts that the domain of drivenBy property is Contract class, the variable ?contr is known to hold instances of Contract class. Hence, with the above access restriction for Contract class, the user query is rewritten to include appropriate apply pattern as shown below.

```
Query:
    { ?contr pred:drivenBy    ?dept .
      ?contr pred:hasDueDate    ?due }
Rewritten query:
    { ?contr pred:drivenBy    ?dept .
      ?contr pred:hasDueDate    ?due .
      ?contr pred:hasMember
          "sys_context('sa$appctx',
          'app_user_uri'}"^^orardf:instruction }
```

The match pattern for a constraint involving an RDF property may conditionally restrict access to specific instances of the property based on its object value. For example, contracts with a value greater than 100,000 may have a stricter access policy than those with a lower value. Such constraints may be expressed using a match pattern that specifies the appropriate condition on the object value.

```
Constraint Group: manager
Match:  { ?contract    pred:hasContractValue    ?cvalue .
          FILTER (?cvalue > 100000 }
Apply:  { ?contract    pred:hasManager
          "sys_context('sa$appctx',
          'app_user_uri'}"^^orardf:instruction }
```

The above constraint restricts access to the hasContractValue property to the contract's manager if the value is greater than 100000. A user may have unrestricted access to other instances of this property (values less than 100000). With this constraint in effect, each user query accessing the hasContractValue property, is rewritten to include additional query patterns that enforce this policy. One such sample query is shown below.

```
Query:
    { ?contr pred:drivenBy    ?dept .
      ?contr pred:hasContractValue ?val }
Rewritten query:
    { ?contr pred:drivenBy    ?dept .
      ?contr pred:hasContractValue ?val .
      OPTIONAL { ?contr :hasManager
           "sys_context(..)"^^orardf:instruction .
                ?obgp1 ora:let "1"^^xsd:boolean } .
      FILTER ( (?val > 100000 && BOUND(?obgp1) )
                || not(?val > 100000) )
```

The use of (SPARQL standard) OPTIONAL clause and the FILTER clause ensures that the constraint is applied if the contract value is within the range specified by the VPD constraint. Additional constraints may be specified to apply alternate restriction for varying values for the property's object value. For example, the following constraint further restricts a manager's access to the contract value property if the value is greater than 1000000.

```
Constraint Group: manager
   Match: { ?contract   pred:hasContractValue   ?cvalue .
           FILTER (?cvalue > 1000000 }
   Apply: { FILTER (1=0)}
```

The above apply pattern with a FILTER clause 1=0 ensures that it is always false. This constraint in combination with the earlier constraint ensures that a manager has access to the property for specific ranges of the contract value.

When a basic graph pattern in a SPARQL query matches multiple data access constraints, the corresponding apply patterns are combined to form a conjunctive graph pattern, which is subsequently enforced by logically rewriting the SPARQL query. While considering the data access constraints to be enforced for a given SPARQL query, the class and property hierarchy associated with the security policy is consulted to automatically enforce applicable constraints. Hence, a variable or term identified as an instance of a specific RDF Class enforces constraints associated with the class and its superclasses. Further, a constraint associated with a property is enforced when the user query references the property or any property defined as its sub-property or an equivalent property.

Figure 3:
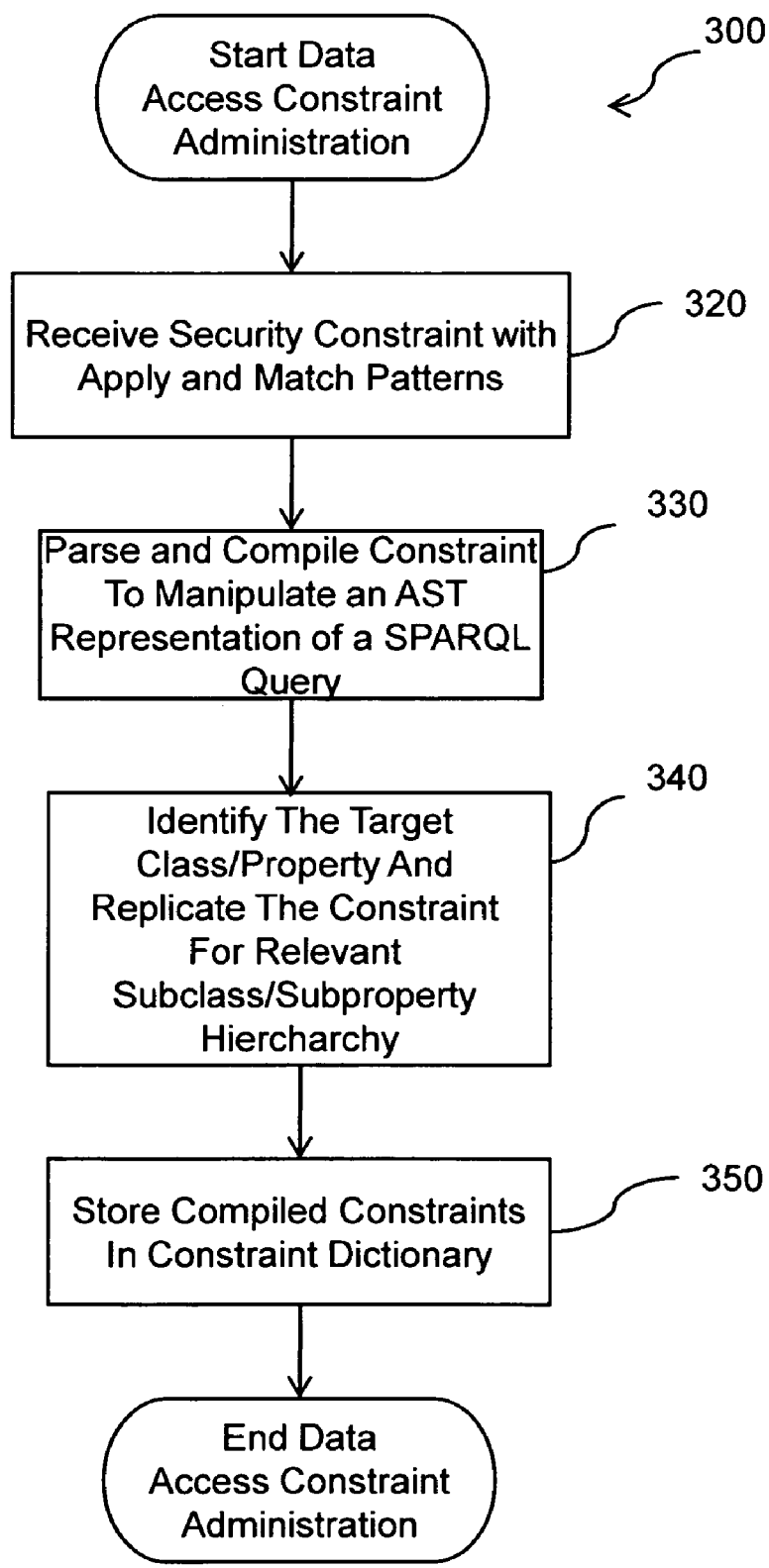
FIG. 3 illustrates an example embodiment of a method associated with access control for RDF data.

FIG. 3 illustrates an example embodiment of a method 300 that manages data access constraints using graphical representations of RDF data and SPARQL query language. At 320, a security constraint and its corresponding apply and match patterns are received. At 330, the security constraint is parsed and compiled into instructions that can manipulate an Abstract Syntax Tree (AST) representation of a SPARQL query. At 340 the target RDF class/property is identified and the constraint is replicated for any relevant subclass or subproperty hierarchy as identified using metadata. At 350, the compiled constraints are stored in a security policy data access constraint dictionary.

Figure 4:
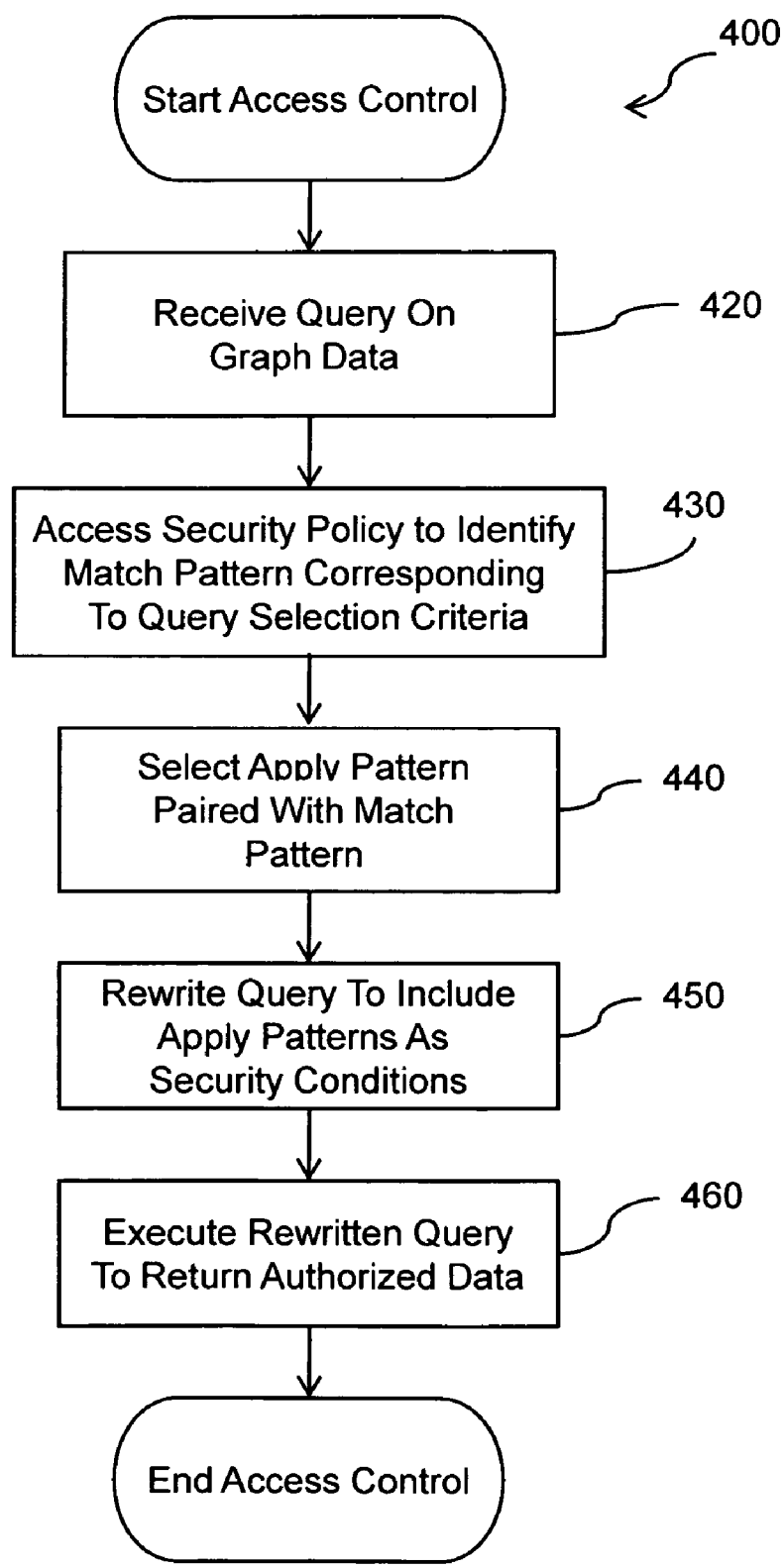
FIG. 4 illustrates an example embodiment of a method associated with access control for RDF data.

FIG. 4 illustrates an embodiment of a method 400 that controls access to RDF data. At 420 a query on RDF data is received. The query in SPARQL format has some selection criteria expressed as graph patterns. At 430, the security policy is accessed to identify one or more match patterns corresponding to the query selection criteria, such as, for example, class information for the terms and variables used in the query and/or RDF properties referenced in the query. At 440, the apply pattern for the identified match pattern or patterns is selected. At 450, the query is rewritten to include the apply patterns in the appropriate query blocks as the security conditions involving the resources matched by the match pattern. At 460, the rewritten query is executed on the RDF data to return authorized data.

Figure 5:
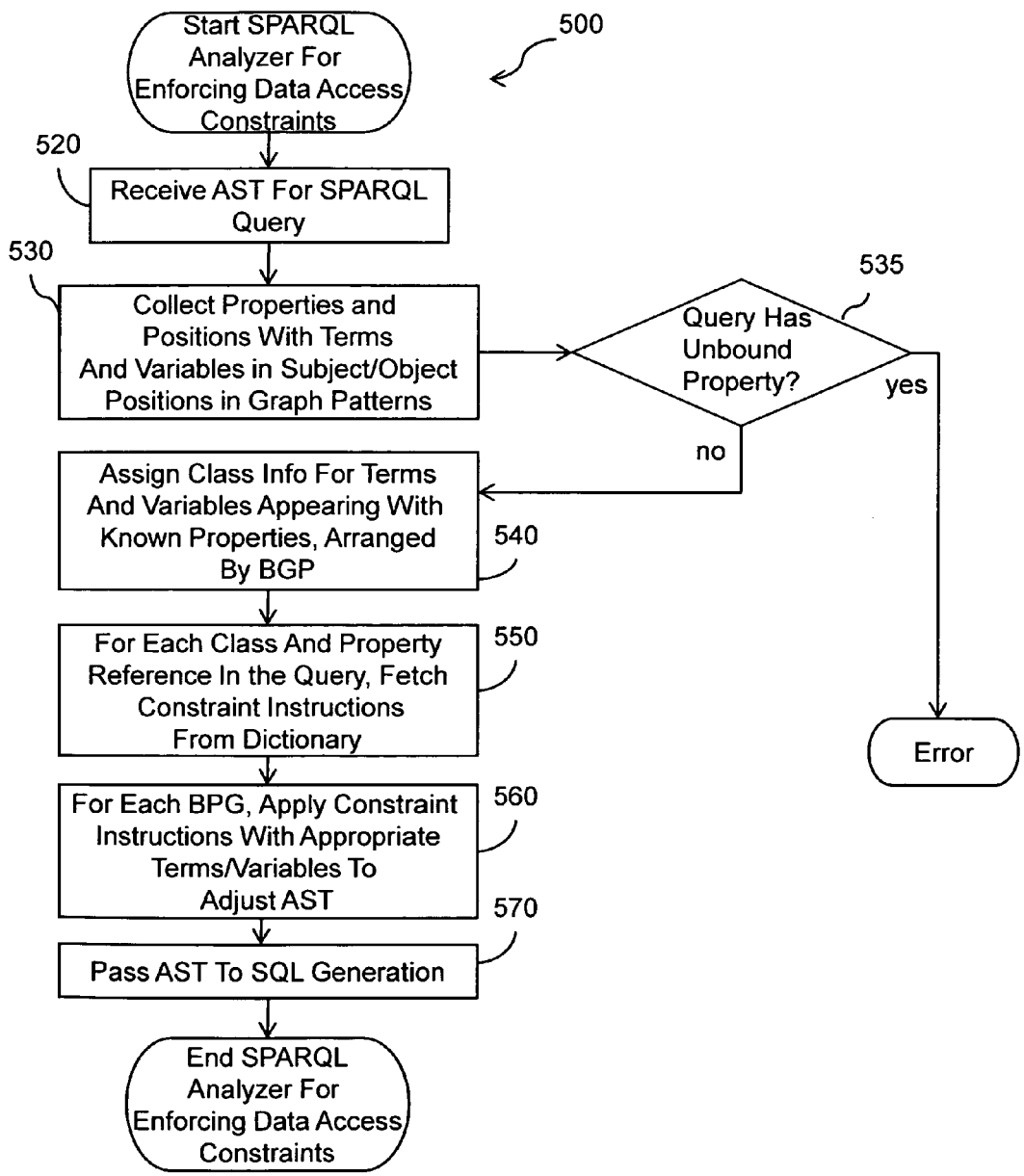
FIG. 5 illustrates an example embodiment of a method associated with access control for RDF data.

FIG. 5 illustrates a particular embodiment of a method 500 for analyzing SPARQL queries and enforcing security constraints on the SPARQL queries. At 520, the Abstract Syntax Tree (AST) for a user's SPARQL query is received. For example, the following SPARQL query, which requests the status and value of all projects, may be parsed and the corresponding AST could be received:

{?prj pred:hasStatus ?status. ?prj pred:hasValue ?val}

At 530, the AST is walked to collect RDF properties and their relative positions with terms and variables in subject or object positions in the graph patterns. In the example, the following AST listing RDF properties and their relative positions could be returned:

```
<SimpleNode type="JJTINPUT">
   <SimpleNode type="JJTGROUPGRAPHPATTERN">
      <SimpleNode type="JJTTRIPLESBLOCK">
         <SimpleNode type="JJTTRIPLEATOM" name="PRJ"
         kind="VAR"/>
         <SimpleNode type="JJTTRIPLEATOM"
         name="http://www.myorg.com/contract/properties/hasStatus"
         Kind="URI"/>
         <SimpleNode type="JJTTRIPLEATOM" name="STATUS"
         kind="VAR"/>
         <SimpleNode type="JJTTRIPLESBLOCK">
            <SimpleNode type="JJTTRIPLEATOM" name="PRJ"
            kind="VAR"/>
            <SimpleNode type="JJTTRIPLEATOM"
            name="http://www.myorg.com/contract/properties/hasValue"
            kind="URI"/>
            <SimpleNode type="JJTTRIPLEATOM" name="VAL"
            kind="VAR"/>
         </SimpleNode>
      </SimpleNode>
   </SimpleNode>
</SimpleNode>
```

At 535 an error is generated if the query references an unbound property (a variable in the predicate position of a triple graph pattern). At 540, the security policy metadata is consulted to assign class information for terms and variables appearing with known properties, arranged by the Basic Graph Pattern (BGP) in which it appears. At 550, for each unique class and property referenced in the query, the appropriate data constraint instructions are fetched from the dictionary. In the example, the instructions from compiling the following match and apply pattern in method 300 (FIG. 3) could be fetched:

```
match_pattern : { ?proj prjp:hasValue ?val }
apply_pattern : { ?proj prjp:drivenBy ?dept . ?dept prjp:hasDeptLead
   "Steve" xsd:string }
```

At 560, for each BGP referencing a class or a property, the instructions for matching data access constraints are applied with appropriate terms and/or variables to adjust the AST accordingly. At 570 the updated AST is passed to the SQL generation component. In the example, the following updated AST could be passed to the SQL generation component:

```
<SimpleNode type="JJTINPUT">
   <SimpleNode type="JJTGROUPGRAPHPATTERN">
      <SimpleNode type="JJTTRIPLESBLOCK">
         <SimpleNode type="JJTTRIPLEATOM" name="PRJ" kind="VAR"/>
         <SimpleNode type="JJTTRIPLEATOM"
         name="http://www.myorg.com/contract/properties/hasStatus" kind="URI"/>
         <SimpleNode type="JJTTRIPLEATOM" name="STATUS" kind="VAR"/>
         <SimpleNode type="JJTTRIPLESBLOCK">
            <SimpleNode type="JJTTRIPLEATOM" name="PRJ" kind="VAR"/>
            <SimpleNode type="JJTTRIPLEATOM"
```

-continued

```
name="http://www.myorg.com/contract/properties/hasValue" kind="URI"/>
    <SimpleNode type="JJTTRIPLEATOM" name="VAL" kind="VAR"/>
    <SimpleNode type="JJTTRIPLESBLOCK">
        <SimpleNode type="JJTTRIPLEATOM" name="PRJ" kind="VAR"/>
        <SimpleNode type="JJTTRIPLEATOM" name="2503312289076973251"
kind="URI"/>
        <SimpleNode type="JJTTRIPLEATOM" name="RDF$VPDPSDO_1"
kind="VAR"/>
        <SimpleNode type="JJTTRIPLESBLOCK">
            <SimpleNode type="JJTTRIPLEATOM" name="RDF$VPDPSDO_1"
kind="VAR"/>
            <SimpleNode type="JJTTRIPLEATOM" name="4608806456053747963"
kind="URI"/>
            <SimpleNode type="JJTTRIPLEATOM" name="3040175570950691107"
kind="URI"/>
        </SimpleNode>
        </SimpleNode>
    </SimpleNode>
    </SimpleNode>
</SimpleNode>
</SimpleNode>
```

While FIGS. 1-5 illustrate various actions occurring in serial, it is to be appreciated that various actions illustrated in FIGS. 1-5 could occur substantially in parallel. By way of illustration, a first process could create an RDF graph, a second process could create a security policy, and a third process could enforce the security policy. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes receiving a query on graph data, where the query includes some selection criteria with references to one or more graph properties, terms, or variables; accessing match pattern and apply pattern pairs to identify one or more match patterns corresponding to a query selection criteria; selecting an apply patterns that are associated with the identified match patterns; and rewriting the query to include the apply patterns as security conditions, using appropriate terms and variables from the user query. While executable instructions associated with the above method are described as being stored on a computer-readable medium, it is to be appreciated that executable instructions associated with other example methods described herein may also be stored on a computer-readable medium.

Figure 6:
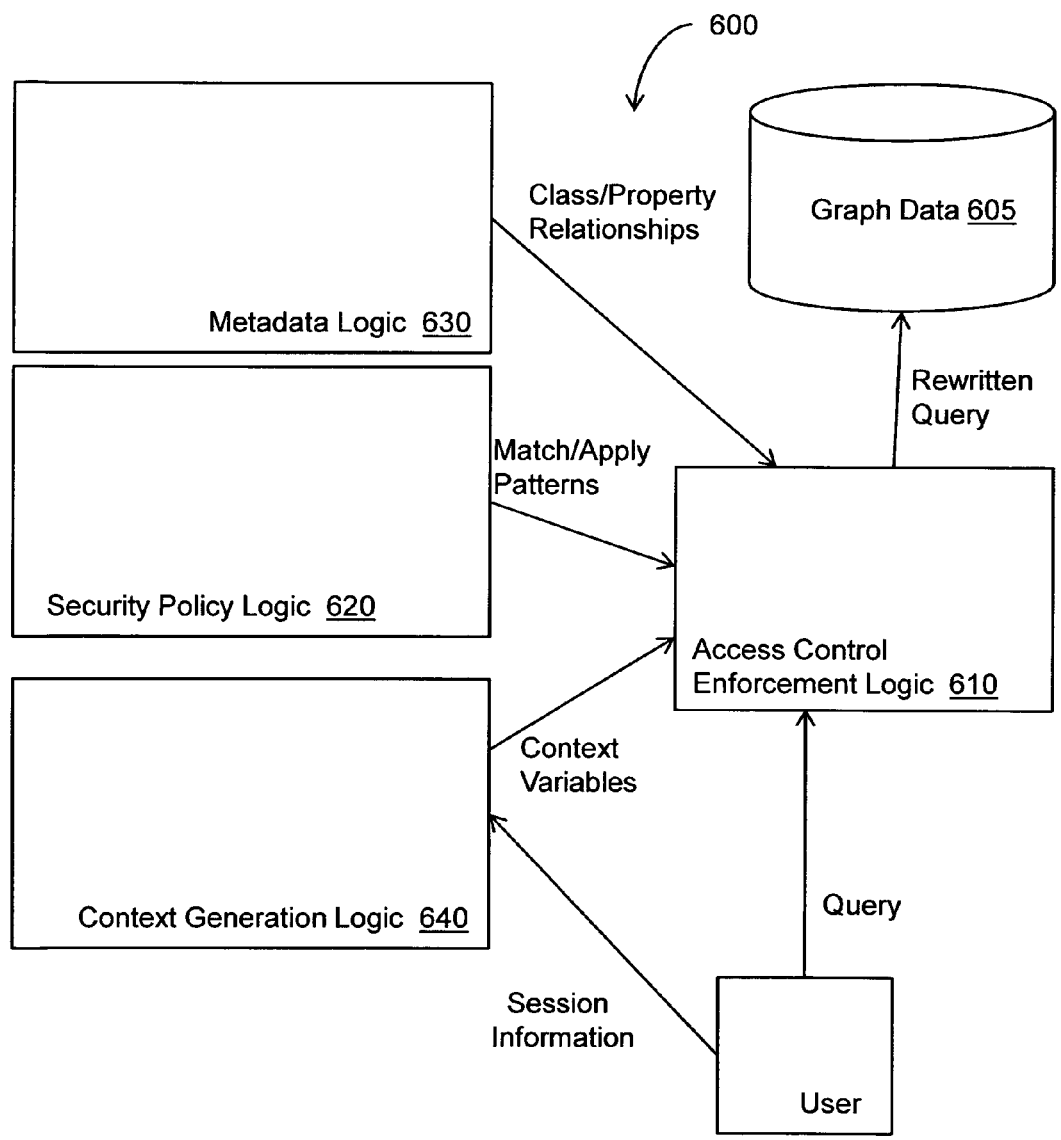
FIG. 6 illustrates an example embodiment of a system associated with access control for RDF data.

FIG. 6 illustrates an embodiment of a system for controlling access to RDF data 600. RDF data is stored in a database 605. User seeking to retrieve data from the RDF data executes a query. The query is received by an access control enforcement logic 610 that determines one or more match patterns that correspond to the properties, terms and variables referenced in the query; and rewrites the query to include the apply pattern that is paired with the determined match pattern. The access control enforcement logic 610 retrieves the match and apply patterns from a security policy logic 620 that stores data access constraints as match pattern and apply pattern pairs in a compiled form. Each match pattern specifies a match pattern criteria that identifies the resources that are subject to a security policy, and an associated apply pattern specifies one or more security conditions, in the form of query graph patterns, to be included with each query that satisfies the match pattern criteria.

A metadata logic 630 stores metadata that may include one or more of: domain and range information for RDF properties in the RDF data, sub-class relationships within the RDF data, or sub-property relationships within the RDF data and where the access control enforcement logic retrieves information from the metadata logic to identify match patterns that are related to a received query. A context generation logic 640 retrieves context information regarding a query processing session. In some instances, the access control enforcement logic 610 inserts the context information in the apply pattern when rewriting the query. In other instances, the access control enforcement logic 610 includes an access policy suppression logic that selectively disables one or more data access constraints based on the context information for a given query processing session.

Figure 7:
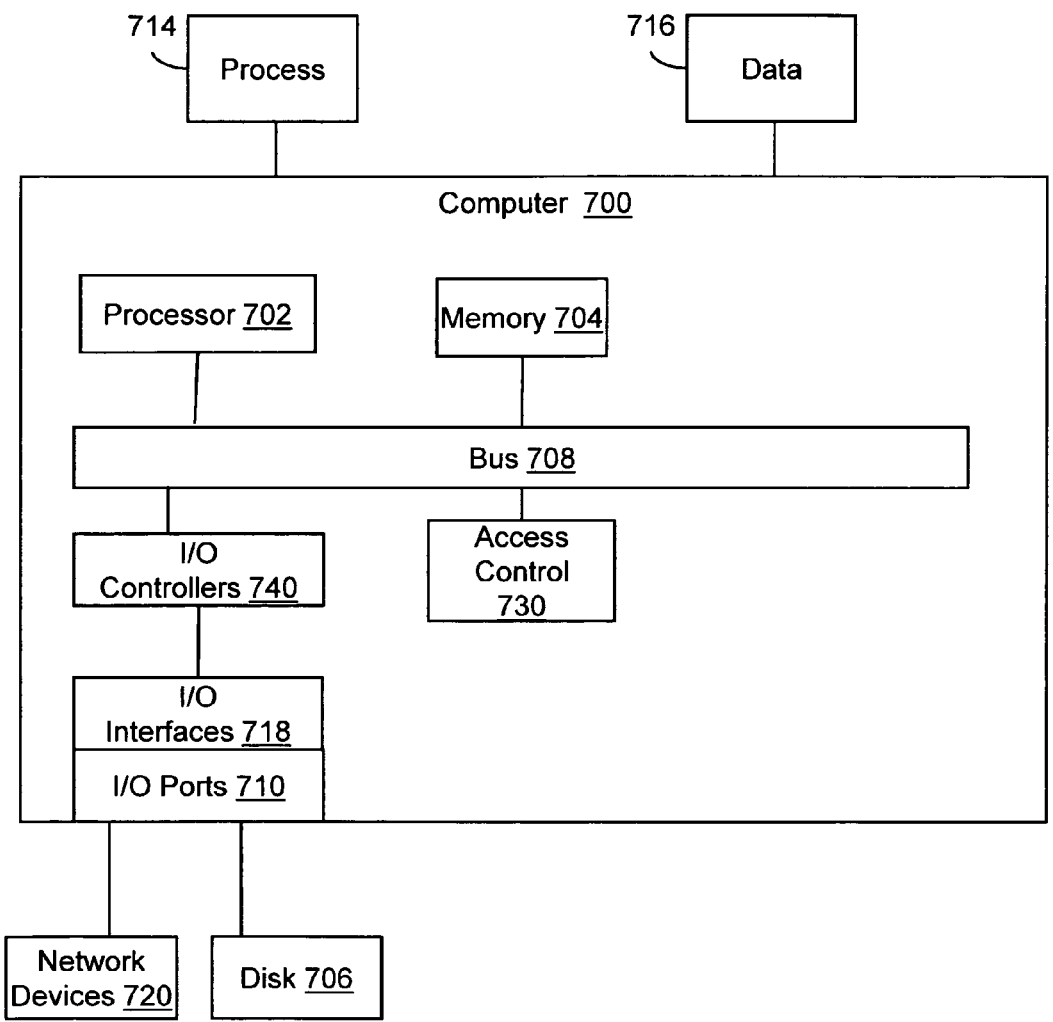
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include an access control logic 730 configured to facilitate controlling access to RDF data. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, logic 730 may provide means (e.g., hardware, software, firmware) for controlling access to RDF data.

The means may be implemented, for example, as an ASIC programmed to control access to RDF data. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A computer-implemented method, comprising:
   receiving a query on graph data, where the query includes one or more selection criteria;
   expressing the query selection criteria in a tree representation of an abstract syntactic structure using metadata;
   analyzing the tree representation of the query selection criteria to collect properties and any terms or variables in subject or object positions with respect to the collected properties;
   accessing a security policy comprising data access constraints expressed as match pattern and apply pattern pairs to identify a match pattern corresponding to a collected property, term, or variable in the query selection criteria, where the match pattern binds one or more variables to corresponding data instances accessed in the query;
   selecting an apply pattern that is associated with the identified match pattern;
   rewriting the query to include security conditions specified in the apply pattern; and
   executing the rewritten query on the graph data to return data according to the security policy such that data instances returned by the rewritten query satisfy the data access constraints specified by the match pattern and apply pattern.

2. The computer-implemented method of claim 1 where the apply pattern defines one or more graph patterns using the one or more variables bound in the match pattern.

3. The computer-implemented method of claim 1 where the query selection criteria comprises a graph pattern associated with a class and further where the match pattern binds a variable to instances of the class and its subclasses.

4. The computer-implemented method of claim 3 comprising deriving one or more of the class and its subclasses from a domain of a property referenced in the query.

5. The computer-implemented method of claim 1 where the query selection criteria comprises a graph pattern associated with a property and further where the match pattern binds two variables to subject, object pairs associated with the property and related sub-properties.

6. The computer-implemented method of claim 5 comprising deriving one or more of the property and related sub-properties from a property hierarchy.

7. The computer-implemented method of claim 1 comprising determining contextual information for the query and further where the apply pattern defines a graph pattern that includes the contextual information.

8. The computer-implemented method of claim 1 comprising performing a union of the selected apply patterns and rewriting the query to include security conditions specified in the union of the apply patterns.

9. The computer-implemented method of claim 1 where the match pattern specifies a filter condition that restricts access to instances of a property based on a value of an object of the property and comprising rewriting the query to selectively impose the security conditions in the selected apply pattern when the filter condition is true.

10. The computer-implemented method of claim 1 comprising determining contextual information for the query and selectively disabling security policy components based on the contextual information.

11. The computer-implemented method of claim 1 comprising storing metadata information related to the security policy, the metadata comprising one or more of: domain and range information for properties in the data, sub-class relationships within the data, or sub-property relationships within the data.

12. A computing system that processes queries on graph data, comprising: a memory; a security policy logic that stores data access constraints as match pattern and apply pattern pairs in the memory, where each match pattern specifies a selection criteria that identifies the resources that are subject to a security policy, and where associated apply pattern specifies one or more security conditions, in the form of graph patterns to be included with any query that satisfies the match pattern criteria;

an access control enforcement logic that expresses query selection criteria in a tree representation of an abstract syntactic structure using metadata, analyzes the tree representation to collect properties and any terms or variables in subject or object positions with respect to the collected properties; determines a match pattern corresponding to at least one of the collected properties, terms, or variables in the query selection criteria; and rewrites the query to include, as security conditions, the graph patterns from the apply pattern that is paired with the determined match pattern;

and a query processor for executing the rewritten query on graph data such that data instances returned by the rewritten query satisfy the data access constraints specified by the match pattern and apply pattern.

13. The computing system of claim 10 comprising a metadata logic that stores one or more of: domain and range information for properties in the data, sub-class relationships within the data, or sub-property relationships within the data and where the access control enforcement logic retrieves information from the metadata logic to identify match patterns that are related to a received query.

14. The computing system of claim 12 comprising a context generation logic that retrieves context information regarding a query processing session and further where the access control enforcement logic inserts context information in the apply pattern when rewriting the query.

15. The computing system of claim 14 where the access control logic comprises an access policy suppression logic that selectively disables one or more data access constraints based on the context information for a given query processing session.

16. A non-transitory computer-readable medium storing computer-executable instructions that when executed by a computer cause the computer to perform a method, the method comprising:

receiving a query on graph data, where the query includes one or more query selection criteria;

expressing the query selection criteria in a tree representation of an abstract syntactic structure using metadata;

analyzing the tree representation of the query selection criteria to collect properties and any terms or variables in subject or object positions with respect to the collected properties;

accessing a security policy that expresses data access constraints as match pattern and apply pattern pairs to identify one or more match patterns corresponding to one or more collected properties, terms, or variables in a query selection criteria;

selecting the apply patterns that are associated with the identified match patterns; and rewriting the query to include, as security conditions, graph patterns specified in the apply pattern such that data instances returned by the rewritten query satisfy the data access constraints specified by the match pattern and apply pattern.

17. The non-transitory computer-readable medium of claim 16 where the computer-executable instructions include deriving one or more of the class and its subclasses from a domain of a property referenced in the query and accessing match patterns associated with the derived class and its subclasses.

18. The non-transitory computer-readable medium of claim 16 where the computer-executable instructions include deriving one or more of property and related sub-properties from a property hierarchy associated with a property referenced in the query and accessing match patterns associated with the derived property and related sub-properties.

19. The non-transitory computer-readable medium of claim 16 where the computer-executable instructions include determining contextual information for the query and further where the apply pattern defines a graph pattern that includes the contextual information.

20. The non-transitory computer-readable medium of claim 16 where the computer-executable instructions include determining contextual information for the query and selecting match pattern and apply pattern pairs based on the contextual information.

21. A system, comprising:

means, embodied as computer-readable medium storing computer executable instructions, for expressing data constraints in a security policy as match pattern and apply pattern pairs where each match pattern specifies a match pattern criteria that identifies resources that are subject to the security policy, and where associated apply pattern specifies one or more security conditions, expressed as graph query patterns, to be included with each query that satisfies the match pattern criteria;

means, embodied as non-transitory computer-readable medium storing computer executable instructions, for compiling and storing the match pattern and apply pattern pairs;

means, embodied as non-transitory computer-readable medium storing computer executable instructions, for analyzing a tree representation of an abstract syntactic structure using metadata of selection criteria in a user query to collect properties and any terms or variables in subject or object positions with respect to the collected properties;

means, embodied as non-transitory computer-readable medium storing computer executable instructions, for determining a match pattern query constraint corresponding to the collected properties and term or variables; and means, embodied as non-transitory computer-readable medium storing computer executable instructions, for rewriting the query to include the graph patterns from the access pattern that is paired with the determined match pattern such that data instances returned by the rewritten query satisfy the data access constraints specified by the match pattern and apply pattern.

* * * * *

UNITED STATES PATENT AND TRADEMARK OFFICE
CERTIFICATE OF CORRECTION

PATENT NO.        : 8,250,048 B2                                          Page 1 of 1
APPLICATION NO.   : 12/386560
DATED             : August 21, 2012
INVENTOR(S)       : Yalamanchi et al.

It is certified that error appears in the above-identified patent and that said Letters Patent is hereby corrected as shown below:

On sheet 4 of 7, in figure 4, Reference Numeral 440, line 1, delete " Apply " and insert -- Apply --, therefor.

In column 12, line 24, delete "narne" and insert -- name --, therefor.

In column 12, line 44, delete "pattem" and insert -- pattern --, therefor.

In column 12, line 45, delete "pattem" and insert -- pattern --, therefor.

Signed and Sealed this
Eighteenth Day of December, 2012

David J. Kappos
*Director of the United States Patent and Trademark Office*